June 30, 1931. J. E. PAUL 1,812,058
LUMINOUS DEVICE
Filed Oct. 11, 1929
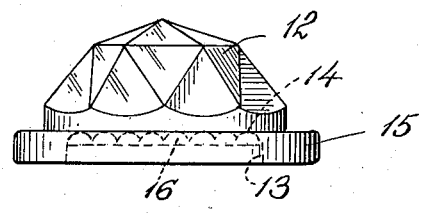
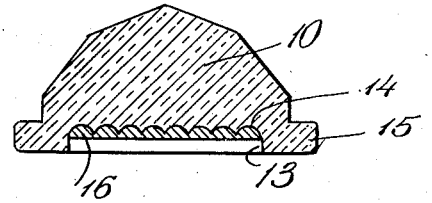
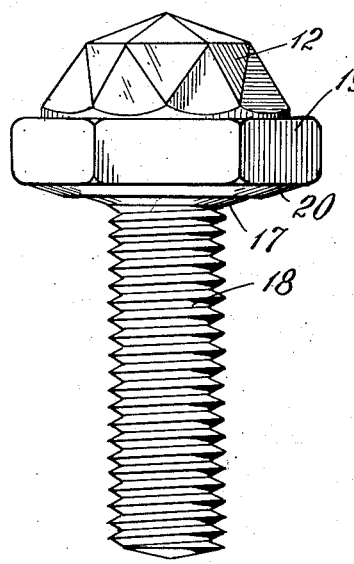
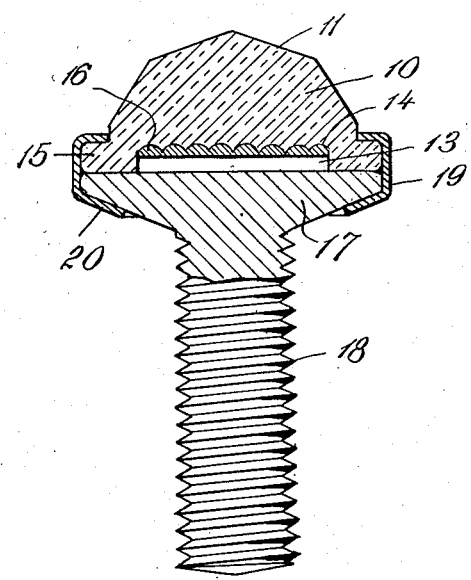
INVENTOR
John E. Paul
BY
ATTORNEYS Patented June 30, 1931

1,812,058

UNITED STATES PATENT OFFICE

JOHN E. PAUL, OF NEWARK, NEW JERSEY, ASSIGNOR TO UNITED STATES RADIUM CORPORATION, OF NEW YORK, N. Y., A CORPORATION OF DELAWARE

LUMINOUS DEVICE

Application filed October 11, 1929. Serial No. 398,952.

This invention relates to devices of the type in which self-luminous compositions are employed for the purpose of rendering the devices visible in the dark. More particularly, the invention is concerned with a device of this kind in which a lens is employed in order to provide an increased luminous effect, the lens being coated on one surface with a quantity of the composition. The device of the invention is especially useful as a means for locating objects such as electrical switches and the like and an embodiment of the invention is the form of a luminous locator adapted for incorporation in the end of a switch button will be described by way of example, though it is to be understood that the utility of the invention is no way limited or confined to this particular use.

The new luminous locator includes a lens which has one convex surface and one relatively flat surface. The flat surface is defined by an upstanding flange which projects outwardly a substantial distance and serves as a means for securing the lens firmly in position on a support. The convex surface of the lens is made up of a multiplicity of small intersecting planes or facets, while the flat surface is provided with a plurality of reflecting areas in the form of bubbles or prisms. The support on which this lens is mounted may conveniently take the form of a flat disc provided with a threaded shank, the disc having a diameter substantially the same as the outer diameter of the flange on the lens. The lens is secured against the upper surface of the disc by means of a ferrule or the like, which is slipped over the lens to engage the flange and then crimped around the edge of the support to bind the lens and the support together. The threaded shank on the support provides a means for anchoring the support in the switch button or other object. The luminous material is applied in the form of a coating over the bubbles or prisms on the under surface of the lens, and this surface is substantially smaller than the face of the lens. By reason of the reflecting action of the bubbles or prisms, light is directed to the facets on the outer surface of the lens in such manner that these facets are visible in the dark, even though the luminous material is not directly in view. An increased luminous effect is thereby obtained.

For a better understanding of the invention, reference may be had to the accompanying drawings, in which Fig. 1 is a view of lens in side elevation;
Fig. 2 is a sectional view through the lens with the coating in place;
Fig. 3 is a view in side elevation; and
Fig. 4 is a sectional view of the complete device.

Referring now to the drawings, the locator is illustrated as consisting of a lens 10 having a convex surface 11 formed with a plurality of facets 12 in the usual manner. This lens is provided with a substantially flat under surface 13 in which is formed a multiplicity of bubbles or prisms 14, which serve as light-reflecting areas. The lens may be of any height desired and the flat surface or back of the lens is of less area than the convex surface or face, having, for example, from ½ to ¾ of the face area. The lens is provided on its back with a flange 15 which extends circumferentially and projects out beyond the edge of the lens to a substantial extent.

The luminous material forms a coating 16 applied to the back section of the lens over the reflecting areas. This luminous material may be a radio-active compound of the desired quality, mixed with an adhesive vehicle. In the application of the coating, the lens is placed with its convex face down and the desired quantity of the luminous paste applied to the back. The particles of the luminous compound, being relatively heavy, sink through the vehicle and come into direct contact with the bubbles, thus giving the best effect. Also when the adhesive hardens, it provides a protective coating over the luminous material.

The lens is mounted on a support which may take the form of a metal disc 17 provided with a threaded shank 18. The lens is placed on the face of the disc and a ferrule 19 slipped over the lens to engage the upper surface of the flange 15. The lower edge of the ferrule is then crimped inwardly below the under surface of the support, as indicated at 20, the ferrule thus securing the edges of the lens to the support.

The use of the reflecting areas on the surface of the lens to which the coating of luminous material is applied causes the light given off to be diffused in all directions and the apparent size of the luminous coating is magnified by the lens. When the lens is formed with facets on its convex surface, the light passes to the facets in such a manner that the facets are illuminated and visible even when the locator is viewed from an angle such that the luminous material itself is not directly visible. By my construction of the flat surface I am enabled to give the luminous material a much greater exposed surface as the surface with which I cover a part of the flat surface has a much greater area than a plane surface and this surface is so formed that the light from the luminous material is dispersed in all directions. Together with the faceted convex surface it produces a maximum effect much greater than that which would be obtained with a plane surface. Through this dispersion of light and the refraction by the faceted surfaces the luminous surface is given the appearance of being much larger than it really is and may actually appear to be twice its area when viewed from the front. On account of the refraction of the facets it is also possible to see the illuminated lens from almost any angle. Owing to the large amount of exposure which the luminous material obtains by the light dispersing surface formed for it on the flat side of the lens, a very small amount of luminous material suffices in place of the much larger amounts formerly necessary.

What I claim:

1. In a luminous locator the combination of a lens having a convex surface and a relatively flat surface opposite thereto, a plurality of facets on said convex surface, at least a portion of said flat surface being formed of contiguous indentations which form a light dispersing surface and a luminous material upon said dispersing surface.

2. In a luminous locator the combination of a lens having a convex surface and a relatively flat surface, a plurality of facets on said convex surface, a section of said flat surface cut away to form an inset surface parallel to said flat surface, said inset surface being formed of indentations lying substantially contiguous.

In testimony whereof I affix my signature.

JOHN E. PAUL.